(12) United States Patent
Jeong et al.

(10) Patent No.: US 9,410,612 B2
(45) Date of Patent: Aug. 9, 2016

(54) SHIFT LEVER ASSEMBLY FOR AUTOMATIC TRANSMISSION VEHICLE AND ASSEMBLING METHOD THEREOF

(71) Applicants:Hyundai Motor Company, Seoul (KR); Kia Motors Corporation, Seoul (KR)

(72) Inventors: Won Jin Jeong, Hwaseong-Si (KR); Sang Yoon Kim, Seoul (KR); Jeong Seon Min, Gwangju (KR); Deok Ki Kim, Hwaseong-si (KR); Min Keun Kwon, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 14/103,691

(22) Filed: Dec. 11, 2013

(65) Prior Publication Data

US 2015/0107390 A1 Apr. 23, 2015

(30) Foreign Application Priority Data

Oct. 17, 2013 (KR) ........................ 10-2013-0123957

(51) Int. Cl.
*B60K 20/00* (2006.01)
*F16H 59/02* (2006.01)
*F16H 63/00* (2006.01)

(52) U.S. Cl.
CPC .... *F16H 59/0278* (2013.01); *F16H 2059/0269* (2013.01); *F16H 2063/005* (2013.01); *Y10T 29/49826* (2015.01); *Y10T 74/2014* (2015.01)

(58) Field of Classification Search
CPC .......... F16H 59/0278; F16H 2059/026; F16H 59/02; F16H 59/0269; B60K 20/04
USPC ................................ 74/473.3, 473.1, 473.36
See application file for complete search history.

(56) References Cited

U.S. PATENT DOCUMENTS

| 2,737,843 | A | * | 3/1956 | Koehl | F16B 19/004 29/525 |
|---|---|---|---|---|---|
| 4,941,557 | A | * | 7/1990 | Flotow | F16D 13/385 192/111.4 |
| 7,148,434 | B2 | * | 12/2006 | Chi | F16H 59/02 200/332 |
| 7,237,450 | B2 | * | 7/2007 | Ogasawara | F16H 59/10 74/335 |
| 7,241,095 | B2 | | 7/2007 | Apsey | |
| 7,487,850 | B2 | * | 2/2009 | Lucas | B60K 1/00 180/65.1 |
| 7,730,802 | B2 | * | 6/2010 | Takikawa | F16H 59/10 74/473.1 |
| 2007/0214907 | A1 | * | 9/2007 | Kato | F16H 59/0204 74/473.1 |
| 2014/0053673 | A1 | * | 2/2014 | Choi | F16H 59/10 74/473.3 |
| 2014/0345410 | A1 | * | 11/2014 | Yamamoto | F16H 59/105 74/473.3 |

FOREIGN PATENT DOCUMENTS

| EP | 0 215 675 A1 | 3/1987 | | |
|---|---|---|---|---|
| GB | EP 0215675 A1 | * | 3/1987 | ............ F16B 19/004 |

(Continued)

*Primary Examiner* — William Kelleher
*Assistant Examiner* — Joseph Brown
(74) *Attorney, Agent, or Firm* — Morgan, Lewis & Bockius LLP

(57) ABSTRACT

A shift lever assembly and assembling method for an automatic transmission vehicle may include a shift lever housing including divided components to be assembled, a shift lever, when assembled, one end of which is disposed in the divided components and connected pivotably to one or more of the divided components and the other end of which is arranged to protrude outside through a range hole formed in one of the divided components, and a plurality of elastic pins that are fitted cooperatively into the divided components when assembled to connect integrally the divided components.

11 Claims, 6 Drawing Sheets

(56) References Cited

FOREIGN PATENT DOCUMENTS

| JP | 2004-26131 A | 1/2004 |
| JP | 2004-268727 A | 9/2004 |
| JP | 2009-269598 A | 11/2009 |
| JP | 2012-153301 A | 8/2012 |
| KR | 2001-0008649 A | 2/2001 |
| KR | 20-0381175 Y1 | 3/2005 |
| KR | 10-0783516 B1 | 12/2007 |
| KR | 10-2009-0103660 A | 10/2009 |

* cited by examiner

SHIFT LEVER ASSEMBLY FOR AUTOMATIC TRANSMISSION VEHICLE AND ASSEMBLING METHOD THEREOF

CROSS-REFERENCE TO RELATED APPLICATION

The present application claims priority of Korean Patent Application Number 10-2013-0123957 filed on Oct. 17, 2013, the entire contents of which application are incorporated herein for all purposes by this reference.

BACKGROUND OF INVENTION

1. Field of Invention

The present invention relates to a shift lever assembly for an automatic transmission vehicle and an assembling method of the shift lever assembly, in which a shift lever housing and a shift lever can be assembled automatically through a process in an automation production line process.

2. Description of Related Art

Generally, a shift lever installed to be disposed on a surrounding of a driver in an automatic transmission vehicle is connected pivotably front/rearward to a shift lever housing to be disposed selectively on P(parking), R(reverse), N(neutral) D(driving) while moving along a range groove formed in a shift lever housing when a driver operates it.

The shift lever assembly described in the present specification, as shown in FIGS. 1 and 2, refers to an assembling structure of a shift lever housing 1 and the shift lever 2, and the shift lever housing 1 is manufactured integrally with its upper/lower parts being opened, the upper opening becomes a range hole 1a through which the shift lever 2 can move.

Accordingly, the shift lever 2 is installed to a shift lever housing 1 to manufacture a shift lever assembly such that the shift lever 2 is inserted into the lower opening of the shift lever housing 1 and an upper part of the shift lever 2 passes through the range hole 1a, and a hinge shaft 3 serving as a rotation center of the shift lever 2 is installed to pass through a side of the shift lever housing 1 and the shift lever 2, and then a nut 4 is fastened to a tip end of the hinge shaft 3 to assemble completely the shift lever housing 1 and the shift lever 2.

However, in the conventional shift lever assembly as described above the shift lever housing 1 is formed integrally and thus it cannot assemble automatically the shift lever housing 1 and the shift lever 2 in an automation production line process, and further the hinge shaft 3 and the nut 4 which are fastened using a screw cannot be assembled automatically in an automation production line process. Accordingly, all procedures of the shift lever assembly has to be performed manually with hands, thereby producing assembly tolerance and reducing productivity.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to solve at least some of the above-described problems associated with the prior art. Various aspects of the present invention provide for a shift lever assembly for an automatic transmission vehicle and an assembling method thereof, in which a shift lever housing is configured with several divided components to assemble automatically the shift lever housing and the shift lever in an automation production line process and further the several divided components of the shift lever housing are assembled automatically in an automation production line process, and thus all assembling procedures of the shift lever assembly are performed automatically, not manually, in an automation production line process.

Various aspects of the present invention seek to improve productivity of the shift lever assembly by performing all assembling procedures of the shift lever assembly in an automation production line process to minimize assembling tolerance thereby to improve quality.

Various aspects of the present invention provide for a shift lever assembly for an automatic transmission vehicle that may include: a shift lever housing including divided components to be assembled; a shift lever, when assembled, one end of which is disposed in the divided components and connected pivotably to one or more of the divided components and the other end of which is arranged to protrude outside through a range hole formed in one of the divided components; and a plurality of elastic pins that are fitted cooperatively into the divided components when assembled to connect integrally the divided components.

In some cases, one or each elastic pin in the plurality of elastic pins may be formed of a cylindrical pipe with a cross-sectional C shape, wherein a cutting groove is formed from one end to the other end of the cylindrical pipe. In some cases, one or each elastic pin in the plurality of elastic pins may be formed with a flat plate that is wound to form a spiral shape.

In various other aspects, a shift lever assembly for an automatic transmission vehicle may comprise: a shift lever housing including a left cover, a right cover and an upper cover in a form of divided components to be assembled together; a shift lever with a pair of lever protrusions formed integrally on and protruded from left and right surfaces of an lower end of the shift lever, wherein the pair of lever protrusions are to be assembled pivotably to an inner surface of the left cover and an inner surface of the right cover, respectively, and wherein when assembled an upper end of the shift lever is protruded outside through a range hole formed in the upper cover; and a plurality of elastic pins that are fitted cooperatively into the left cover, the right cover and the upper cover to connect integrally the left cover, the right cover and the upper cover.

An operation space may be provided between the left cover and the right cover for the lower end of the shift lever to be pivoted around the lever protrusions after the left cover, the right cover and the upper cover are assembled. Protrusion grooves into which the lever protrusions are fitted pivotably may be formed in an inner surface of the left cover and an inner surface of the right cover, respectively. In some cases, one or each elastic pin in the plurality of elastic pins may be formed of a cylindrical pipe with a cross-sectional C shape, wherein a cutting groove is formed from one end to the other end of the cylindrical pipe. In some cases, one or each elastic pin in the plurality of elastic pins may be formed with a flat plate that is wound to form a spiral shape. The shift lever assembly for an automatic transmission vehicle may further comprise a pair of bushes that are fitted into the lever protrusions, respectively, and prevent a direct contact between the lever protrusions and the corresponding protrusion grooves thereby preventing friction therebetween and eliminate a gap between the lever protrusions and the corresponding protrusion grooves.

In still various other aspects, an assembling method of a shift lever assembly for an automatic transmission vehicle may comprise: a shift lever assembling step of assembling a lower end of a shift lever to be disposed pivotably in a left cover and a right cover and an upper end of the shift lever to pass through a range hole formed in an upper cover and protrude outside when the left cover, the right cover and the upper cover are assembled; and a shift lever housing assembling step of fitting cooperatively a plurality of elastic pins into assembling openings formed in the left cover, the right cover and the upper cover, respectively, to connect integrally the left cover, the right cover and the upper cover.

When the lower end of the shift lever is assembled in the shift lever housing assembling step, lever protrusions formed on one side and the other side of the lower end of the shift lever may be fitted into protrusion grooves formed in an inner surface of the left cover and in an inner surface of the right cover, respectively. The bushes may be fitted into the lever protrusions, respectively, and then the bushes may fitted into the protrusion grooves respectively, to prevent a direct contact between the lever protrusions and the corresponding protrusion grooves thereby preventing friction therebetween and further eliminate a gap between the lever protrusions and the corresponding protrusion grooves. In some cases, one or each elastic pin in the plurality of elastic pins may be formed of a cylindrical pipe with a cross-sectional C shape, wherein a cutting groove is formed from one end to the other end of the cylindrical pipe, wherein a diameter of the elastic pin is varied to be smaller than a corresponding assembling opening in the assembling openings before fitting the elastic pin into the assembling opening, and the elastic pin with the diameter being varied to be smaller is fitted into the assembling opening. In some cases, one or each elastic pin in the plurality of elastic pins may be formed with a flat plate that is wound to form a spiral shape, wherein a diameter of the elastic pin is varied to be smaller than a corresponding assembling opening in the assembling openings before fitting the elastic pin into the assembling opening, and the elastic pin with the diameter being varied to be smaller is fitted into the assembling opening.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
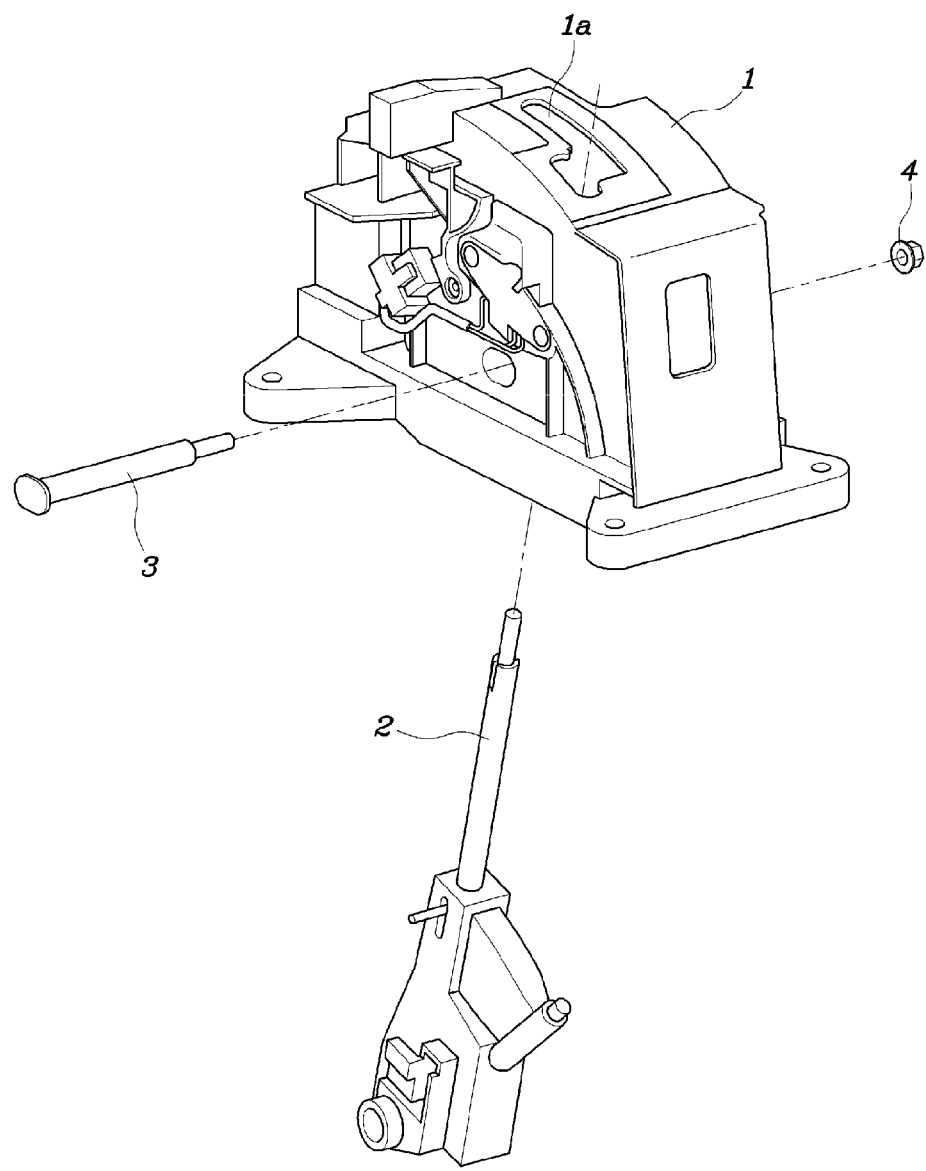
FIG. 1 is a perspective view illustrating a shift lever assembly for an automatic transmission vehicle, which is disassembled, according to a related art.
Figure 2:
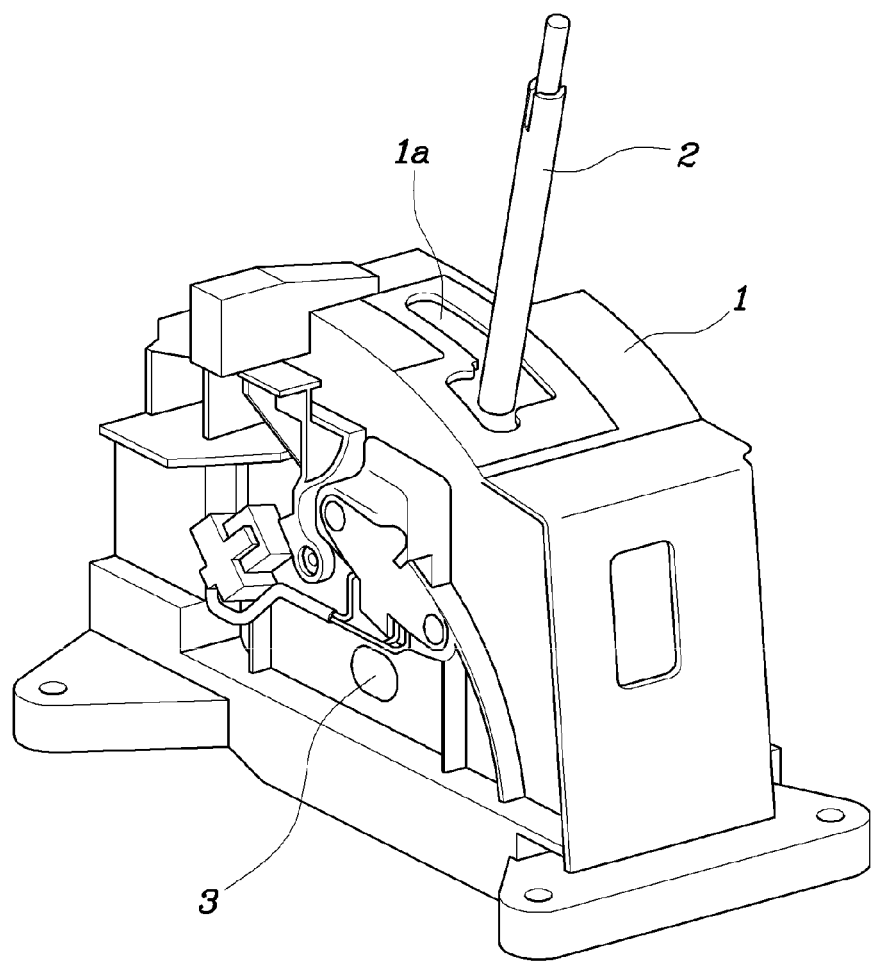
FIG. 2 is a perspective view illustrating a shift lever assembly for an automatic vehicle, which is assembled, as shown in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The shift lever assembly for an automatic transmission vehicle is configured such that a shift lever housing is divided into several components, and a shift lever housing and a shift lever are assembled automatically in an automation production line process, and the several divided components of the shift lever housing are assembled in an automation production line process.

That is, the shift lever assembly for an automatic transmission vehicle according to the present invention, as shown in FIGS. 3 to 6, includes: a shift lever housing 50 including several divided components 51, 52, 53, which can be assembled; a shift lever 60 one end of which is disposed in the several divided components 51, 52, 53 when assembled, to be connected pivotably to the divided components 51, 52 and the other end of which is arranged to protrude outside through a range hole 53a formed in the divided component 53 when the several divided components are assembled; and a plurality of elastic pins 70, 90 that are fitted simultaneously or cooperatively into the divided components 51, 52, 53 when assembled to connect integrally the divided components 51, 52, 53.

Figure 3:
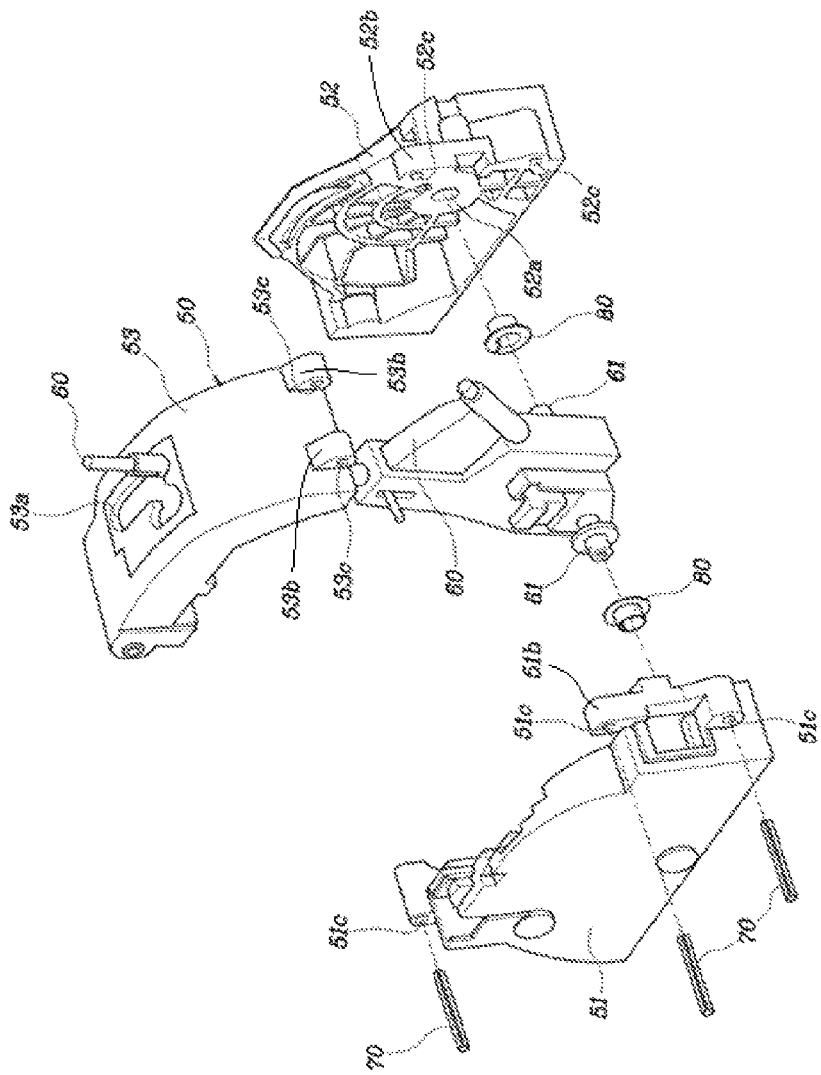
FIG. 3 is a perspective view illustrating an exemplary shift lever assembly for an automatic transmission vehicle, which is disassembled, according to the present invention.
Figure 4:
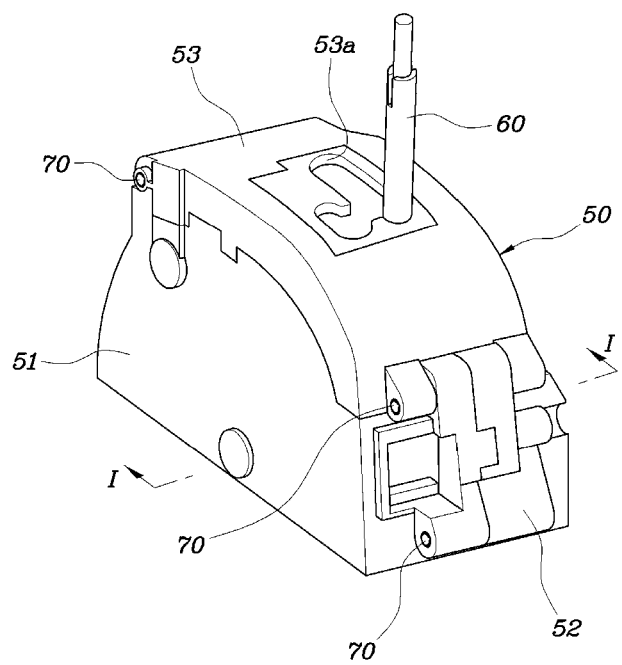
FIG. 4 is a perspective view illustrating the shift lever assembly for an automatic vehicle, which is assembled, as shown in FIG. 3.
Figure 5:
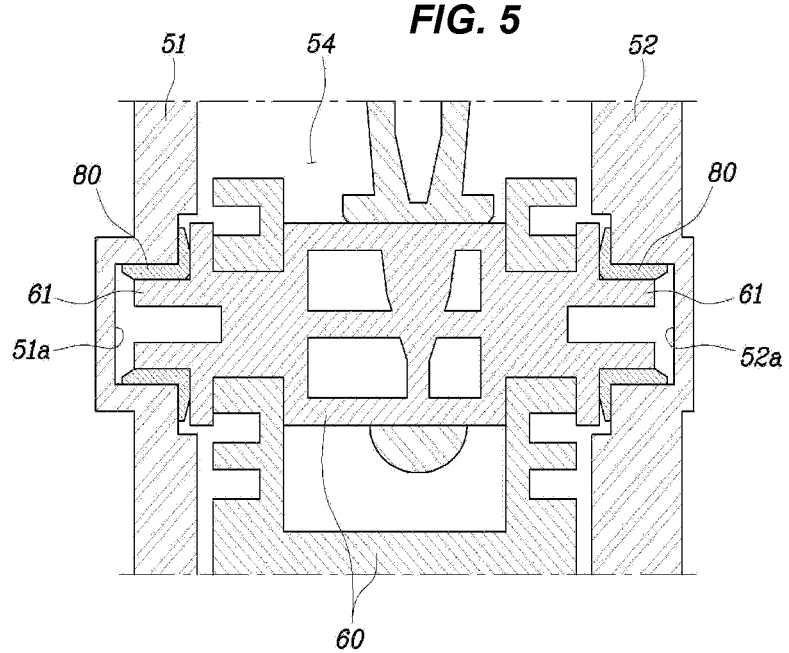
FIG. 5 is a cross-sectional view, taken along line I-I in FIG. 4.
Figure 6:
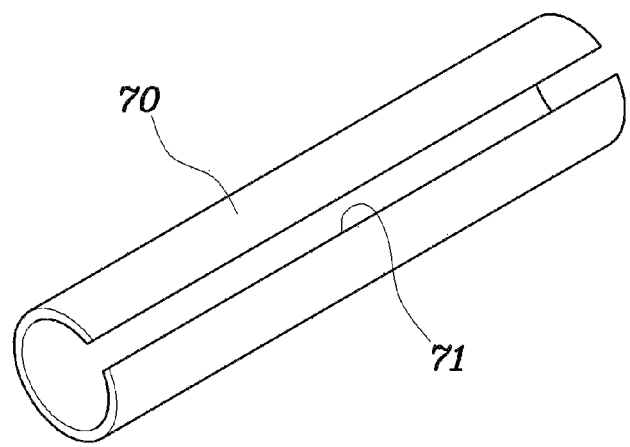
FIG. 6 is a perspective view illustrating an exemplary elastic pin according to the present invention.
Figure 7:
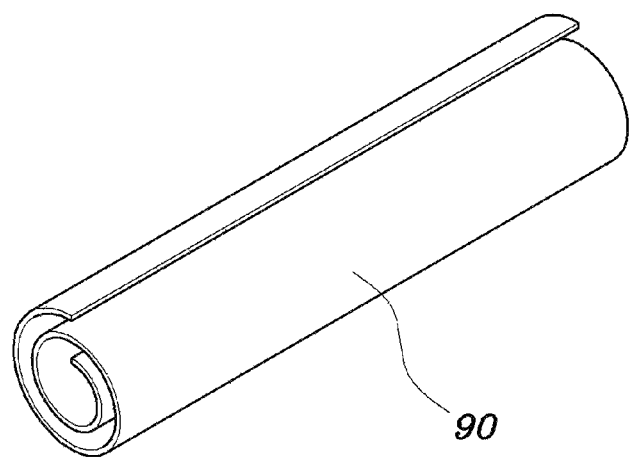
FIG. 7 is a perspective view illustrating another exemplary elastic pin according to the present invention.

In detail description of the shift lever assembly for an automatic transmission vehicle according to the present invention, the shift lever assembly includes: a shift lever housing 50 including the divided left cover 51, right cover 52 and upper cover 53 that can be assembled together; a shift lever 60 on the left and right side surfaces of a lower end of which a pair of lever protrusions 61 that are assembled pivotably to an inner surface of the left cover 51 and an inner surface of the right cover 52, respectively, are formed integrally and protrude from the left and right side surfaces of the lower end of shift lever 60, and an upper end of which is protruded outside through a range hole 53a formed in the upper cover 53; and a plurality of elastic pins 70, 90 that are fitted simultaneously or cooperatively into the left cover 51, the right cover 52 and the upper cover 53 to connect integrally the left cover 51, the right cover 52, and the upper cover 53. In some embodiments, the plurality of elastic pins 70, 90 may be provided as shown in FIGS. 3 and 4. For example, an elastic pin 70 among the plurality of elastic pins is provided at front upper portions of the left cover 51 and the upper cover 53 to fix the covers 51, 53 together. An another elastic pin 70 among the plurality of elastic pins is provided at rear upper portions of the left cover 51, the upper cover 53, and the right cover 52 to fix the covers 51, 53, 52 together. Also another elastic pin 70 among the plurality of elastic pins is provided at rear lower portions of the left cover 51, the upper cover 53, and the right cover 52 to fix the covers 51, 53, 52 together. The elastic pin 70 may be replaced with the elastic pin 90 as shown in FIG. 7.

Here, an operation space 54 is provided between the left cover 51 and the right cover 52 for the lower end of the shift lever 60 to be pivoted front/rearward around the lever protrusions 61 after the left cover 51, the right cover 52 and the upper cover 53 are assembled.

Further, the protrusion grooves 51a, 52a into which the lever protrusions 61 are fitted pivotably are formed in an inner surface of the left cover 51 and an inner surface of the right cover 52 for the lower end of the shift lever 60 to be pivoted.

Meanwhile, the elastic pin 70 according to some embodiments of the present invention is a cylindrical pipe with a section of C shape, from one end to the other end of which a cutting groove 71 is formed wherein a diameter of the elastic pin 70 becomes smaller by elastic deformation when external force is applied to an outer peripheral surface thereof, and the elastic pin returns to its original shape when the external force is removed.

Furthermore, the elastic pin 90 according to some other embodiments of the present invention is configured such that a flat plate is wound to form a spiral spring shape wherein a diameter of the elastic pin 90 becomes smaller by elastic deformation when an external force is applied to an outer peripheral surface thereof, and the elastic pin returns to its original shape when the external force is removed.

The elastic pins 70, 90 are fitted into the assembly openings 51c, 52c, and 53c of assembling parts 51b, 52b, 53b to pass simultaneously or cooperatively therethrough, which are formed in the left cover 51, the right cover 52 and the upper cover 53, respectively, while the left cover 51, the right cover 52, the upper cover 53 and the shift lever 60 are assembled wherein the left cover 51, the right cover 52 and the upper cover 53 are connected integrally through the elastic pins to form the shift lever housing 50 and further the shift lever 60 is assembled pivotably to the shift lever housing 50.

Further, the shift lever assembly of the present invention further includes a pair of bushes 80 that are fitted into the lever protrusions 61, respectively, and prevents a direct contact between the lever protrusions 61 and the protrusion grooves 51a, 52a thereby to prevent friction therebetween and eliminates a gap between the lever protrusions 61 and the protrusion grooves 51a, 52a. The bush 80 may be made of metal or the like having excellent durability, but it is not limited thereto.

Additionally, an assembling method of the shift lever assembly for an automatic transmission vehicle includes: a shift lever assembling step of assembling the lower end of the shift lever 60 to be disposed in the left cover 51 and the right cover 52 to be pivotable and the upper end of the shift lever 60 to pass through the range hole 53a formed in the upper cover 53 to protrude outside, when the left cover 51, the right cover 52 and the upper cover 53 are assembled; and a shift lever housing assembling step of fitting simultaneously or cooperatively the plurality of elastic pins 70, 90 into the assembling openings 51c, 52c, and 53c of assembling parts 51b, 52b, 53b formed in the left cover 51, the right cover 52 and the upper cover 53, respectively, to connect integrally the left cover 51, the right cover 52 and the upper cover 53.

Here, when the lower end of the shift lever 60 is assembled in the shift lever housing assembling step, the lever protrusions 61 formed on one side and the other side of a lower end of the shift lever 60 are fitted into the protrusion grooves 51a, 52a formed in an inner surface of the left cover 51 and in an inner surface of the right cover 52, respectively.

Furthermore, the bushes 80 are fitted into the lever protrusions 61, respectively, and then the bushes 80 are fitted into the protrusion grooves 51a, 52a, respectively, so as to prevent a direct contact between the lever protrusions 61 and the protrusion grooves 51a, 52a thereby to prevent friction therebetween and further eliminate a gap between the lever protrusion 61 and the protrusion grooves 51a, 52a.

Additionally, when the left cover 51, the right cover 52 and the upper cover 53 are assembled integrally using the elastic pins 70, 90, the diameters of the elastic pins 70, 90 are varied to be smaller than the assembling openings 51c, 52c, and 53c of assembling parts 51b, 52b, 53b by applying an external force thereto before fitting the elastic pins 70, 90 into the assembling openings 51c, 52c, and 53c of assembling parts 51b, 52b, 53b, and the elastic pins 70, 90 with the diameters being varied to be smaller are fitted into the assembling openings 51c, 52c, and 53c of assembling parts 51b, 52b, 53b, and when the elastic pins 70, 90 are fitted into the assembling openings 51c, 52c, and 53c of assembling parts 51b, 52b, 53b, the external force is removed from the elastic pins 70, 90, and as a result the elastic pins are assembled to the assembling openings 51c, 52c, and 53c of assembling parts 51b, 52b, 53b to be in close contact while the diameters of the elastic pins 70, 90 return to a state before the external force is applied thereto.

The shift lever assembly for an automatic transmission vehicle according to the present invention is assembled automatically such that a series of all assembling procedures are performed in an automation production line process.

That is, one bush 80 is fitted into the lever protrusion 61 formed on one side of a lower end of the shift lever 60 and the lever protrusion 61 on one side into which the bush 80 is fitted is fitted into the protrusion groove 51a of the left cover 51, and then the left cover 51 and the shift lever 60 are assembled.

Next, another bush 80 is fitted into the lever protrusion 61 formed on the other side of a lower end of the shift lever 60 and the lever protrusion on the other side into which the bush 80 is fitted is fitted into the protrusion groove 52a of the right cover 52, and then the right cover 52 and the shift lever 60 are assembled.

Under the above state, the upper cover 53 is assembled on the upper end of the left cover 51 and the right cover 52 such that the upper end of the shift lever 60 passes through the range hole 53a of the upper cover 53, and at this time the assembling openings 51c, 52c, and 53c of assembling parts 51b, 52b, 53b of the left cover 51, the right cover 52 and the upper cover 53 are in a state of being connected each other.

In a state that the left cover 51, the right cover 52, the upper cover 53 and the shift lever 60 are assembled temporally, when a plurality of elastic pins 70, 90 are fitted into the assembling openings 51c, 52c, and 53c of assembling parts 51b, 52b, 53b to pass simultaneously or cooperatively therethrough, the left cover 51, the right cover 52 and the upper cover 53 are connected integrally to form the shift lever housing 50 and the lower end of the shift lever 60 is connected pivotably to the shift lever housing 50 thereby to complete the assembly of the shift lever assemble according to the present invention.

According to the present invention, the assemble of the shift lever housing 50 including the divided left cover 51, right cover 52 and upper cover 53 and the assemble of the shift lever housing 50 and the shift lever 60 are all performed automatically in an automation production line process, and thus the assembly tolerance between the components can be minimized thereby to improve productivity and save cost.

For convenience in explanation and accurate definition in the appended claims, the terms "upper" or "lower", "front" or "rear", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever assembly for an automatic transmission vehicle, comprising:
    a shift lever housing including a left cover, a right cover and an upper cover in a form of divided components to be assembled together;
    a shift lever with a pair of lever protrusions formed integrally on and protruded from left and right surfaces of a lower end of the shift lever, wherein the pair of lever protrusions are to be assembled pivotably to an inner surface of the left cover and an inner surface of the right cover, respectively, and wherein when assembled an upper end of the shift lever is protruded outside through a range hole formed in the upper cover; and
    a plurality of elastic pins that are fitted cooperatively into the left cover, the right cover and the upper cover to connect integrally the left cover, the right cover and the upper cover,
    wherein protrusion grooves into which the lever protrusions are fitted pivotably are formed in an inner surface of the left cover and an inner surface of the right cover, respectively, wherein assembling parts having assembling openings formed therein are protrusively formed on an outer surface of the left cover, the right cover and the upper cover, respectively, and the assembling openings of the assembling parts are configured to match with each other when assembled and the plurality of elastic pins simultaneously are inserted into the assembling openings of the assembling parts, and
    wherein in a state that the left cover, the right cover and the upper cover are assembled, the assembling parts of the left cover and the right cover are in contact with each other, and arranged between the assembling parts of the upper cover.

2. The shift lever assembly for an automatic transmission vehicle of claim 1, wherein an operation space is provided between the left cover and the right cover for the lower end of the shift lever to be pivoted around the lever protrusions after the left cover, the right cover and the upper cover are assembled.

3. The shift lever assembly for an automatic transmission vehicle of claim 1, wherein one of the elastic pins is configured to pass through one of assembling openings of the left cover, at least an assembling opening of the upper cover, and one of assembling openings of the right cover sequentially and engaged to the one of assembling openings of the left cover, the at least an assembling opening of the upper cover, and the one of assembling openings of the right cover.

4. The shift lever assembly for an automatic transmission vehicle of claim 1, wherein one or each elastic pin in the plurality of elastic pins is formed of a cylindrical pipe with a cross-sectional C shape, wherein a cutting groove is formed from one end to the other end of the cylindrical pipe.

5. The shift lever assembly for an automatic transmission vehicle of claim 1, wherein one or each elastic pin in the plurality of elastic pins is formed with a flat plate that is wound to form a spiral shape.

6. The shift lever assembly for an automatic transmission vehicle of claim 1, further comprising a pair of bushes that are fitted into the lever protrusions, respectively, and prevent a direct contact between the lever protrusions and the corresponding protrusion grooves thereby preventing friction therebetween and eliminate a gap between the lever protrusions and the corresponding protrusion grooves.

7. An assembling method of a shift lever assembly for an automatic transmission vehicle, comprising:
    a shift lever assembling step of assembling a lower end of a shift lever to be disposed pivotably in a left cover and a right cover, and lever protrusions formed in both sides of the lower end of the shift lever to be fitted pivotably into protrusion grooves formed in an inner surface of a left cover and an inner surface of a right cover, respectively, and an upper end of the shift lever to pass through a range hole formed in an upper cover and protrude outside when the left cover, the right cover and the upper cover are assembled; and
    a shift lever housing assembling step of fitting cooperatively and simultaneously a plurality of elastic pins into assembling openings of assembling parts protrusively formed on an outer surface of the left cover, the right cover and the upper cover, respectively, to connect integrally the left cover, the right cover and the upper cover such that the assembling parts of the left cover and the right cover are arranged between the assembling parts of the upper cover.

8. The assembling method of a shift lever assembly for an automatic transmission vehicle of claim 7, wherein one of the elastic pins is configured to pass through one of the assembling openings of the left cover, at least an assembling opening of the upper cover, and one of assembling openings of the right cover sequentially and engaged to the one of assembling openings of the left cover, the at least an assembling opening of the upper cover, and the one of assembling openings of the right cover.

9. The assembling method of a shift lever assembly for an automatic transmission vehicle of claim 7, wherein bushes are fitted into the lever protrusions, respectively, and then the bushes are fitted into the protrusion grooves respectively, to prevent a direct contact between the lever protrusions and the corresponding protrusion grooves thereby preventing friction therebetween and further eliminate a gap between the lever protrusions and the corresponding protrusion grooves.

10. The assembling method of a shift lever assembly for an automatic transmission vehicle of claim 7, wherein one or each elastic pin in the plurality of elastic pins is formed of a cylindrical pipe with a cross-sectional C shape, wherein a cutting groove is formed from one end to the other end of the cylindrical pipe, wherein a diameter of the elastic pin is varied to be smaller than a corresponding assembling opening in the assembling openings before fitting the elastic pin into the assembling opening, and the elastic pin with the diameter being varied to be smaller is fitted into the assembling opening.

11. The assembling method of a shift lever assembly for an automatic transmission vehicle of claim 7, wherein one or each elastic pin in the plurality of elastic pins is formed with a flat plate that is wound to form a spiral shape, wherein a diameter of the elastic pin is varied to be smaller than a corresponding assembling opening in the assembling openings before fitting the elastic pin into the assembling opening, and the elastic pin with the diameter being varied to be smaller is fitted into the assembling opening.

* * * * *